UNITED STATES PATENT OFFICE.

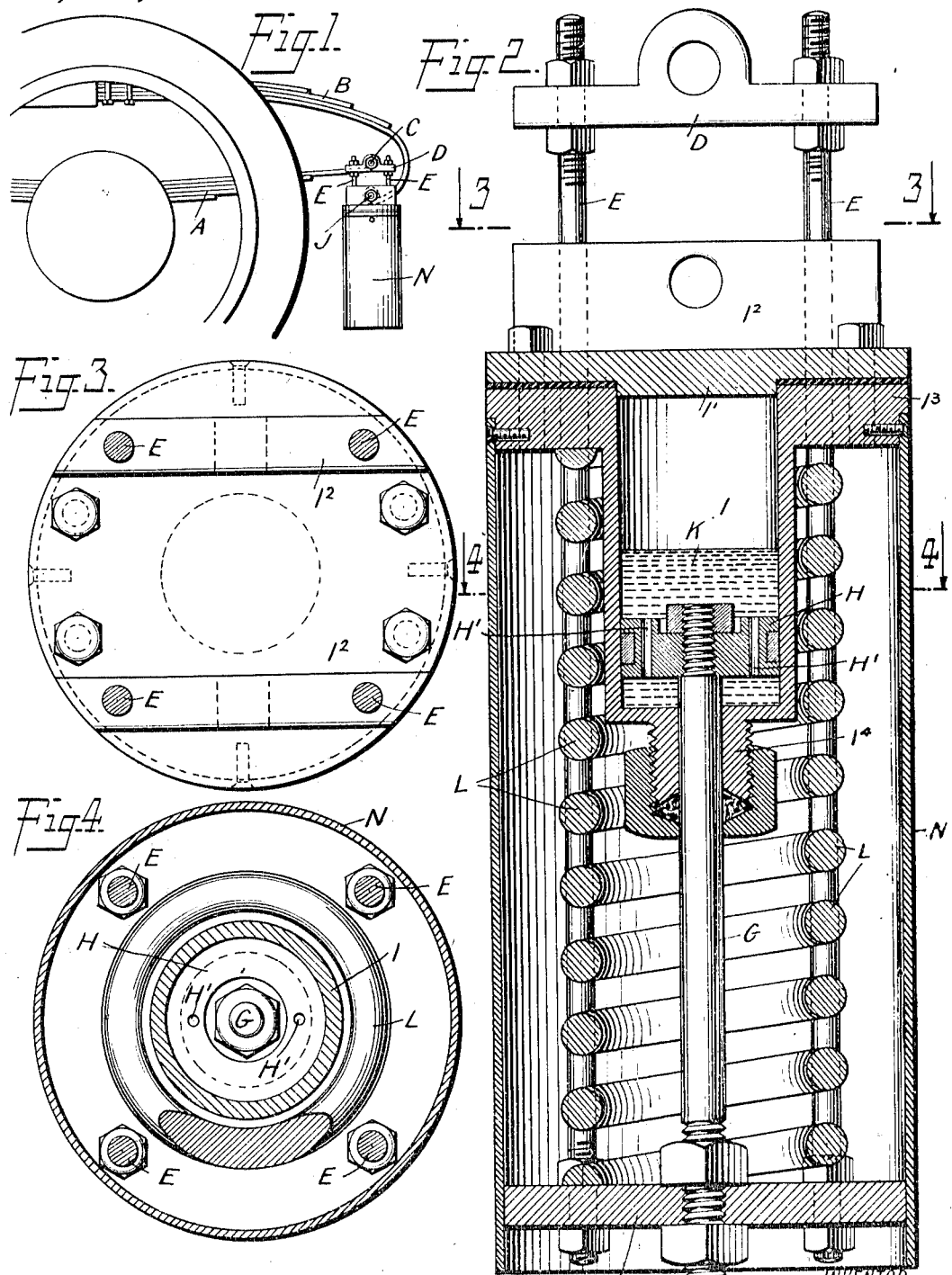
D. M. SHERMAN.
SHOCK ABSORBER.
APPLICATION FILED MAR. 24, 1914.
1,118,818.
Patented Nov. 24, 1914.
WITNESSES
George L. Blume.
Rev. G. Hoster
INVENTOR
DAVID MORTON SHERMAN
BY Munn & Co
ATTORNEYS

DAVID MORTON SHERMAN, OF NEW YORK, N. Y.

SHOCK-ABSORBER.

1,118,818.  Specification of Letters Patent.  Patented Nov. 24, 1914.

Application filed March 24, 1914. Serial No. 826,844.

*To all whom it may concern:*

Be it known that I, DAVID MORTON SHERMAN, a citizen of the United States, and a resident of the city of New York, borough of Manhattan, in the county and State of New York, have invented a new and Improved Shock-Absorber, of which the following is a full, clear, and exact description.

The object of the invention is to provide a new and improved shock absorber more especially designed for use on automobiles and similar vehicles and arranged to absorb the shocks both during the time the vehicle wheel passes up on an obstruction on the roadway and down the same, thus insuring easy and comfortable riding of the occupants of the vehicle.

In order to accomplish the desired result, use is made of a support mounted on the free end of the axle spring, a cylinder supported on the free end of the vehicle body spring and partly filled with a liquid, a piston movable in the said cylinder and connected with the said support, and a spring interposed between the said cylinder and the said support.

A practical embodiment of the invention is represented in the accompanying drawings forming a part of this specification, in which similar characters of reference indicate corresponding parts in all the views.

Figure 1 is a side elevation of the shock absorber as applied; Fig. 2 is an enlarged sectional side elevation of the shock absorber; Fig. 3 is a sectional plan view of the same on the line 3—3 of Fig. 2; and Fig. 4 is a sectional plan view of the same on the line 4—4 of Fig. 2.

The shock absorber, presently described in detail, is interposed between the adjacent free ends of an axle spring A and a body spring B of the automobile or other vehicle, as plainly shown in Fig. 1. For the purpose mentioned the eye of the axle spring A engages a bolt C held in a head D adjustably attached to the upper ends of a series of rods E provided at their lower ends with a crosshead F to which is secured the lower end of a piston rod G carrying a piston H reciprocating in a cylinder I. The cylinder I is provided at its upper end with a head I' having parallel integral bars I² supporting a bolt J engaged by an eye of the body spring B, as plainly shown in Fig. 1. The cylinder I is partly filled with oil or other liquid K, and the piston H is provided with openings H' extending from one face of the piston to the other face thereof so that the piston on reciprocating in the cylinder I causes the liquid K to flow from one end of the cylinder to the other end thereof.

On the crosshead F rests the lower end of a coil spring L abutting with its upper end against the cylinder flange I³ to which the cylinder head I' is secured. The piston rod G passes through a stuffing box I⁴ held on the lower end of the cylinder I to prevent leakage of the liquid K from the cylinder I. A casing N is attached to the flange I³ of the cylinder I and incloses the crosshead F, the spring L and the cylinder I together with the piston rod G, so that the several parts are protected against dust and other extraneous matter.

The operation is as follows: When the vehicle wheel passes up on an obstruction in the roadway then the axle spring A lifts the head D, rods E and crosshead F whereby the spring L is compressed and the piston H is caused to move upward in the cylinder I. By this arrangement the shock incident to the wheel passing up on the obstruction is taken up by the spring L, and when the wheel passes down the obstruction then the spring L in expanding forces down the piston H against the liquid in the lower end of the cylinder I. The liquid is slowly forced into the upper end of the cylinder I by way of the openings H' and hence the spring B is gradually compressed without producing a shock to the vehicle body and the occupants contained therein. It is understood that when the piston H moves upward it lifts the liquid above it as the liquid only partly fills the cylinder I and the liquid K offers very little resistance to this upward movement of the piston H, but when the latter moves downward the liquid in the lower portion of the cylinder I offers considerable resistance as the return flow of the liquid through the openings H' is slow, as it moves against the liquid filling the lower portion of the cylinder.

From the foregoing it will be seen that the shock absorber is double-acting to relieve the body of the vehicle and the occupants of the shocks incident to the wheels of the vehicle passing over obstructions in the roadway.

Although I have shown the shock absorber applied to the axle spring A and the body spring B in the form shown in Fig. 1, it is evident that the shock absorber may be interposed between differently arranged axle springs A and body springs B without deviating from the spirit of my invention.

Having thus described my invention, I claim as new and desire to secure by Letters Patent:

1. A shock absorber for vehicles comprising a cylinder head adapted to be connected with the end of a body spring, a cylinder extending downwardly therefrom, a piston reciprocating in said cylinder and a piston rod extending to the outside of the cylinder in a direction oppositely from the cylinder head, a cross head attached to the outer end of the piston rod, connections between the cross head and the axle spring of the vehicle and a coil spring interposed between the said cross head and the cylinder and abutting at its upper end the said cylinder head.

2. A shock absorber for vehicles, comprising a cylinder having a head adapted to be connected with the end of a body spring of the vehicle, a piston reciprocating in the said cylinder and having a piston rod extending to the outside of the said cylinder, a crosshead attached to the outer end of the said piston rod, rods slidable in the said cylinder head and attached to the said crosshead, the said rods being adapted to be connected with an axle spring of the vehicle, and a coil spring interposed between the said crosshead and the said cylinder.

3. A shock absorber for vehicles, comprising a cylinder having a head adapted to be connected with the end of a body spring of the vehicle, a piston reciprocating in the said cylinder and having a piston rod extending to the outside of the said cylinder, a crosshead attached to the outer end of the said piston rod, rods slidable in the said cylinder head and attached to the said crosshead, the said rods being adapted to be connected with an axle spring of the vehicle, a coil spring interposed between the said crosshead and the said cylinder, and a casing attached to the said cylinder and inclosing the said crosshead and coil spring.

4. A shock absorber for vehicles comprising a solid cylinder head adapted to be connected with the end of a body spring, a cylinder extending downwardly therefrom, and having an opening through its lower end, a piston contained and reciprocating wholly within said cylinder and a piston rod extending to the outside of the cylinder in a direction oppositely from the solid cylinder head, a cross head attached to the outer end of the piston rod, connections between the cross head and the axle spring at the vehicle and a coil spring interposed between the said cross head and the cylinder and abutting at its upper end the said cylinder head.

5. A shock absorber for vehicles comprising a solid cylinder head adapted to be connected with the end of a body spring, a cylinder extending downwardly therefrom and containing a liquid, a piston provided with a passage therethrough contained and reciprocating within said cylinder and a piston rod extending downwardly from said piston, to the outside of the cylinder, a cross head attached to the outer ends of the piston rod, connections between the crosshead and the axle spring of the vehicle, and a coil spring interposed between the said cross head and the cylinder and abutting at its upper end the said cylinder head.

In testimony whereof I have signed my name to this specification in the presence of two subscribing witnesses.

DAVID MORTON SHERMAN.

Witnesses:
 ELI DELAMATER,
 FRED FEIST.